Figure 1:
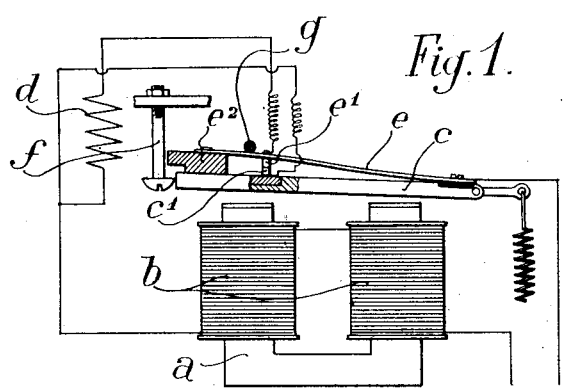

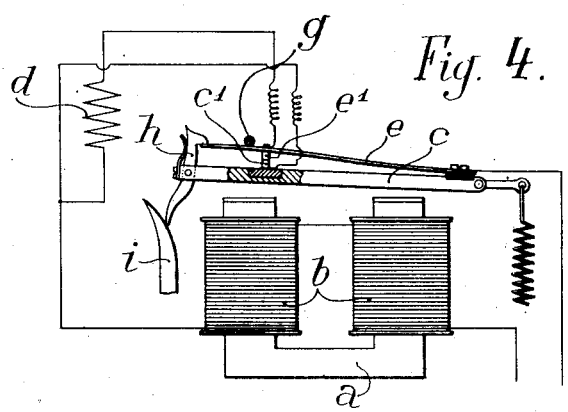
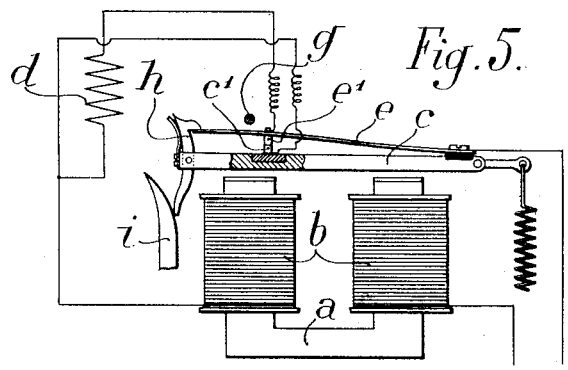
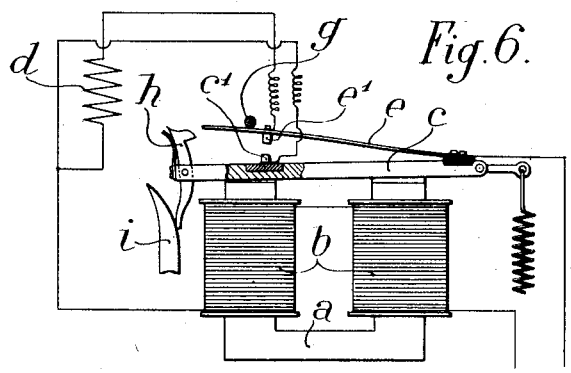

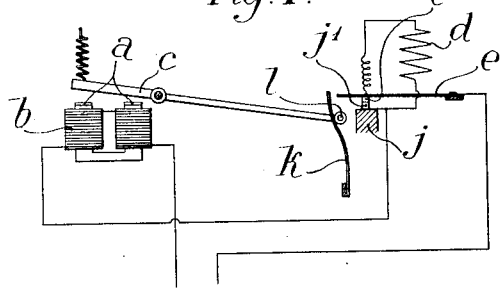
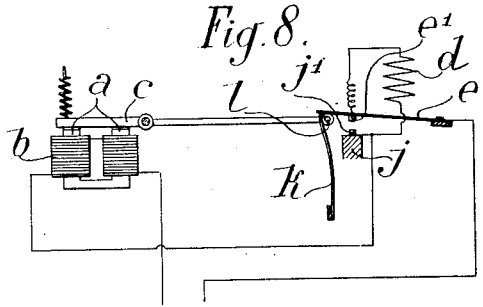
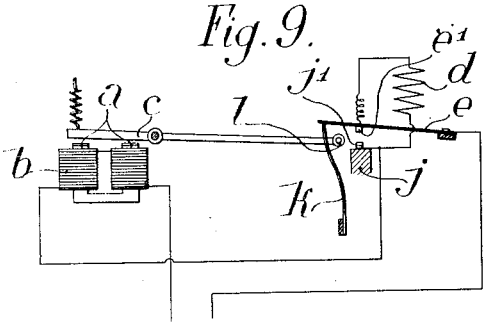

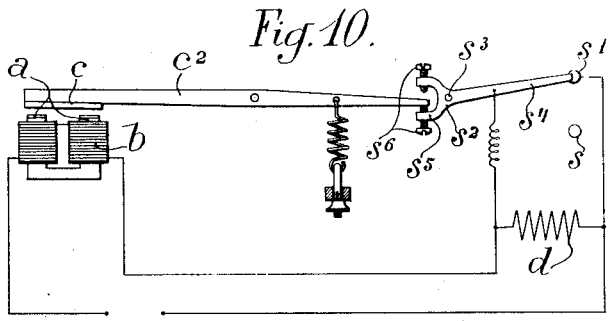
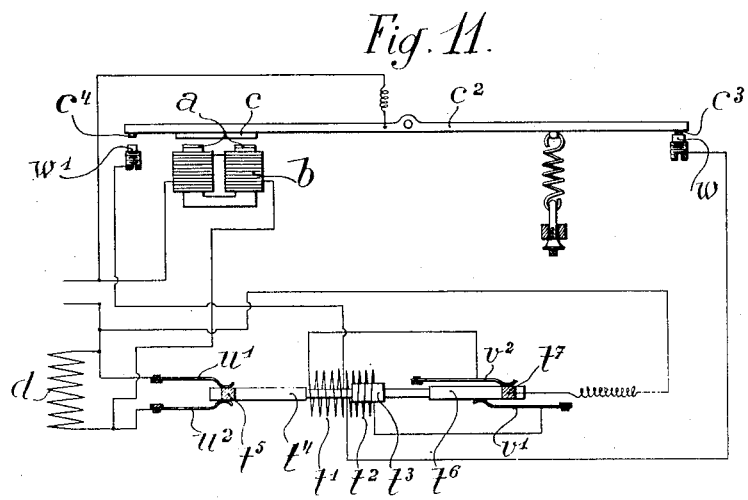
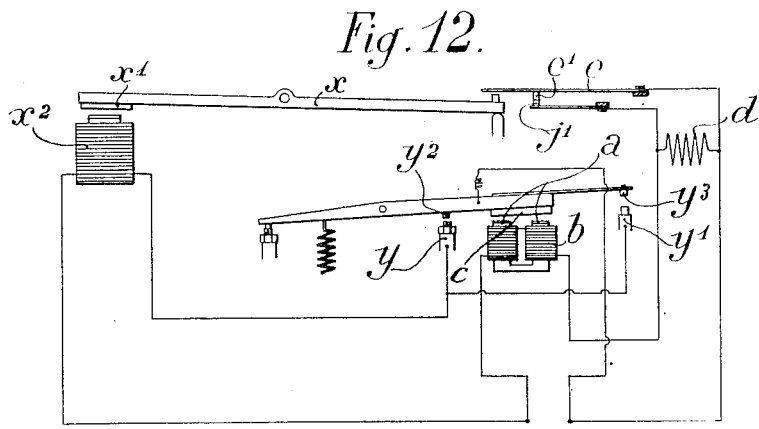

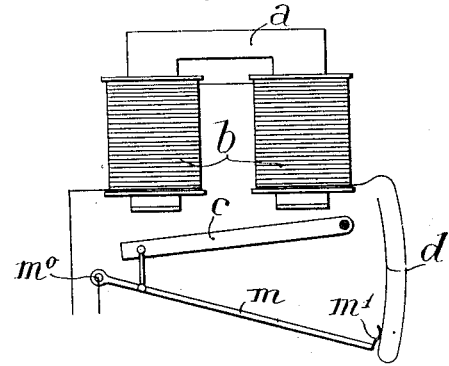
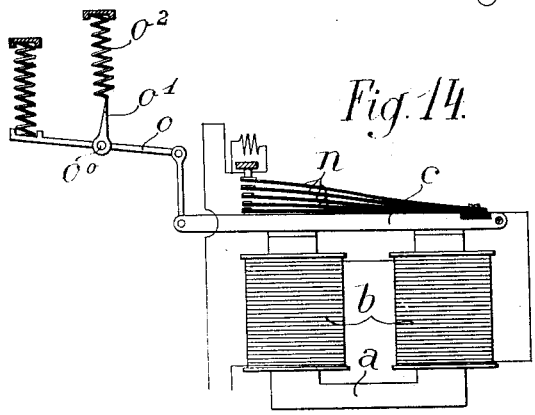
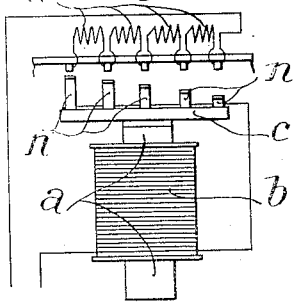

UNITED STATES PATENT OFFICE.

PIERRE BOSSU, OF PARIS, FRANCE, ASSIGNOR TO SOCIÉTÉ ANONYME DES ETABLISSEMENTS L. BLERIOT, OF PARIS, FRANCE.

ELECTROMAGNET AND SIMILAR APPARATUS.

1,106,187. Specification of Letters Patent. Patented Aug. 4, 1914.

Application filed December 14, 1912. Serial No. 736,838.

*To all whom it may concern:*

Be it known that I, PIERRE BOSSU, engineer, a citizen of the French Republic, residing at 171 Rue de Rolbiac, Paris, France, have invented certain new and useful Improvements in Electromagnets and Similar Apparatus, of which the following is a specification.

This invention relates to electromagnets and similar apparatus.

It has for its object to render such apparatus capable of automatically compensating, when the armature is in the contact position, for the effects produced by the variation of the reluctance when the said armature passes from its released position to the said contact position; to render such apparatus capable of producing either a very sudden movement of the armature not only during the attraction of the said armature, but also upon its release, or capable of compensating for the said effects while the armature is intermediate the said contact and released positions, particularly in the use of horse-shoe electro-magnets, which latter possess, in contradistinction to electromagnets of rectilinear shape and consequently with open circuit, a total gap of small size compared to the extent of variations which the reluctance may undergo in ordinary conditions.

Another object of the invention is to enable such apparatus to be built more economically.

The invention consists chiefly in providing such apparatus not only with a device comprising, on the one hand, such a resistance that if it is switched into circuit when the armature of the said apparatus is in its contact position, it should be able to compensate for the effects of the reduction of reluctance which takes place during the passage of the said armature from its released position to the said contact position, and on the other hand, means for rendering the said resistance inoperative both when the said armature is in its released position as well as in positions in proximity thereto, and operative when it is in its other positions, but also, either with means suitable for rendering the said resistance inoperative each time that it has been rendered operative, only at substantially the very moment of the return of the armature to the position where its disengagement is complete, or with means for enabling the said resistance to act also in positions intermediate to the preceding ones, and in such manner that at each moment only a portion in proportion to the extent of the variation, experienced at the same moment, of the reluctance should be switched into circuit.

The invention also consists in using in the apparatus, in place of such resistance, a system which itself must be added to the armature of the apparatus having the tendency to keep it in the detached position; and in arranging the said system in such a manner, in cases when it is not used alone, that its influence on the armature to which it is added, should be practically the same in any position of the said armature.

Figure 2:
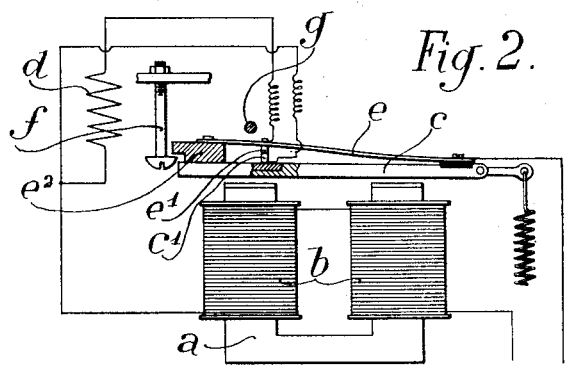
Figure 3:
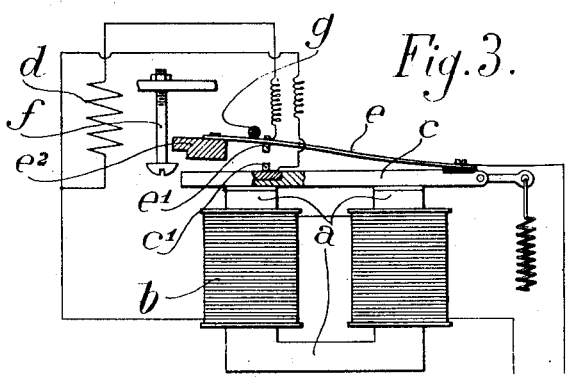
Figure 16:
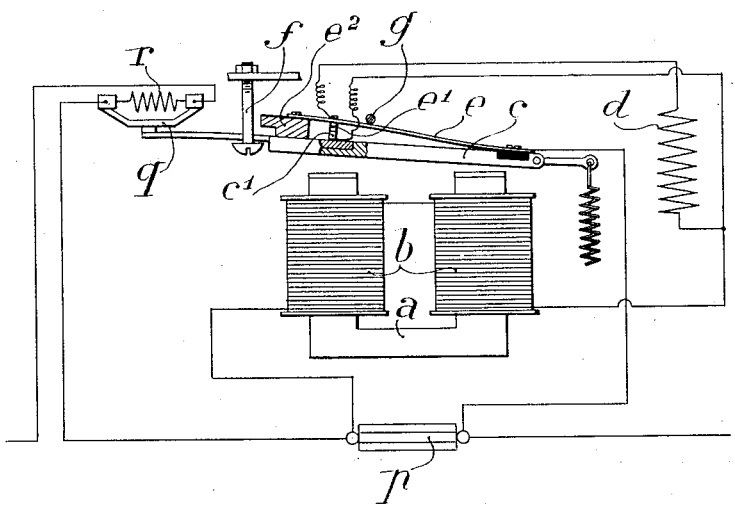

In the drawings:—Figures 1–3 are front elevations of an electro-magnet constructed according to this invention, showing respectively the positions assumed by the elements, when the armature is released, during the attraction, and when in contact. Figs. 4–6 show a modification of the electro-magnet. Figs. 7–9 show further modifications. Figs. 10–12 show diagrammatically in front elevation, three further modified forms of electromagnets. Fig. 13 shows, in front elevation, an electromagnet constructed in accordance with a further modification. Figs. 14 and 15 show respectively in front elevation and partial end view, a further modification of an electro-magnet embodying the present invention. Fig. 16 shows an electromagnet similar to that of Fig. 1, combined with means for enabling it to operate as means for preventing an overload.

In the present instance the invention is shown in connection with a horse-shoe magnet comprising a core $a$ of suitable shape, a winding $b$ and an armature $c$, with which is also used a resistance $d$ which when the said armature $c$ is in its contact position, is capable of compensating either more or less or exactly, for the effects produced on the flux by the variation of reluctance, which latter occurs whenever the said armature passes from its released position to its contact position. Moreover, either such means are used that render the said resistance inoperative when the armature $c$ is in its released position, and maintain it inoperative after the said armature has been attracted and commences its movement toward contact position, and also render said resistance operative at substantially the end of the said movement and maintain it operative until its complete return to released position; or, such means are used that cause the said resistance, which is then constructed accordingly, to act at each moment in the manner desired to prevent the said effects from ever taking place and thus produce a very precise apparatus. To accomplish the first of the said operations, and as shown in Figs. 1-3, a spring blade $e$ is secured to the outer face of the armature $c$ having a recessed end in such manner that it is insulated from the said armature and has a tendency to remain away from the latter. This blade $e$ is provided with a contact $e'$ which is brought into engagement with a corresponding contact $c'$ provided on the armature $c$, the blade having at its end a small mass of soft iron $e^2$ which latter is opposite to the recessed end of the armature $c$. When the electro-magnet is excited, the attraction of its core $a$ is exerted on the armature $c$ and the mass $e^2$, the movement of the mass $e^2$ toward the core being arrested at a certain point by a stop $f$ which is on or in fixed relation to the frame of the electromagnet. Further, the said frame has a stop $g$ for limiting the releasing movement of the said blade $e$. The resistance $d$ is so connected in the winding circuit of the magnet that the resistance is short-circuited as long as there is engagement between the said contacts, and on the contrary, this resistance is switched into the circuit of the electromagnet when the said contacts are disengaged, the resistance $d$ being normally short-circuited, (see Fig. 1).

In the device shown in Figs. 1-3, when the armature is attracted, the soft iron mass $e^2$ is simultaneously attracted until it is stopped by the abutment $f$. The resistance $d$ is thus switched into the electromagnet winding circuit, the current passing through the said winding decreasing and being insufficient to maintain the mass $e^2$ in its attracted position. The said mass is consequently brought by the blade $e$ in its released position, (Fig. 3). Thus, when the armature is released, it comes only into contact with the mass $e^2$ when it reaches its full released position, and the resistance $d$ is only at that time short-circuited. When the said current returns to its original value, or more accurately, to the value which effects release or disengagement of the armature, the latter returns to its normal position, the resistance $d$ still remaining in circuit until the end of the said return, and owing to the reluctance being then forced to increase progressively, the disengagement of the armature takes place promptly.

Figs. 4-6 also disclose the use of a spring blade $e$, a pair of contacts $e'$ and $c'$ and a stop $g$ as in Figs. 1-3, and pivoted to the armature $c$ is a spring controlled hook $h$, the tendency in this instance being to keep the armature and blade together. Combined with the frame of the electromagnet is a cam $i$ to force the said hook to release the blade $e$ when, on the armature $c$ being attracted, the latter arrives at a certain point of its movement, and preventing the hook from coming back to engage with the said blade $e$ before the complete return of the said armature $c$ to its released position. The resistance $d$ is connected in the same manner as above specified, and precisely the same result is obtained.

As shown in Figs. 7-9; the frame of the electromagnet is provided with a part $j$ having a contact $j'$ and is also provided with a spring blade $e$ provided in turn with a contact $e'$, in such a manner that the latter remains in engagement with the said contact $j'$. The said frame also has an additional spring-blade $k$ which is forced to act in such a manner on the said spring blade $e$ that its contact $e'$ is kept away from the contact $j'$. The armature $c$, or a lever connected to the same, is provided with a roller $l$ in such a manner that it acts normally on the blade $k$ so that the said blade cannot act on the blade $e$, and the same roller is forced to move in such a manner, when the armature $c$ itself is caused to move, that, on the one hand, it continues to act in the same way on the blade $k$ until the armature arrives at its contact position, whereupon it operates to lift the blade $e$ and at the same time the blade $k$ passes below the end of the blade $e$, Fig. 8, thus introducing the resistance coil $d$ in series with the magnet winding. When the armature moves toward its released position, the blade $e$ is held lifted by the blade $k$, Fig. 9. When the armature reaches its fully released position, said roller acts on the blade $k$ to withdraw it from beneath the blade $e$ so that the latter releases the blade $e$, and the device is able therefore to return to its original or normal position; the connections of the resistance $d$ being effected in the same way as before and the same result is obtained, as that hereinbefore specified.

As shown in Fig. 10, the means used for switching into circuit or short-circuiting the resistance $d$ comprises a switch embodying a dead contact $s$, a contact $s'$ which is connected to one of the terminals of the resistance $d$ and a lever $s^2$, pivoted at a certain point in its length to a pin $s^3$, which is connected to the other terminal of the resistance $d$ and provided with a comparatively long arm $s^4$, capable of coming into engagement with the said contacts $s$ and $s'$, and a comparatively short arm $s^5$ which is given the shape of a fork, the distance between the ends of the branches of the fork being calculated in a suitable manner and capable of being adjusted, if desired, by means of set screws $s^6$. The armature $c$ is provided with an extension $c^2$ the end of which engages between the branches of the said fork with such a play that, when the said armature is about to arrive at its contact position, the end of its extension $c^2$ strikes the upper branch of the said fork and thus brings the arm $s^4$ into contact with the dead contact $s$ at the very moment when the armature reaches its contact position, the resistance $d$ being thereby switched into the circuit of the electro-magnet. When the armature is about to return to its released position, the end of its extension $c^2$ strikes the bottom branch of the said fork and thus brings the arm $s^4$ into engagement with the contact $s'$ at the very moment when the armature reaches its released position, the resistance $d$ being thereby short-circuited.

As shown in Fig. 11, means is provided for the purpose of avoiding any sparking during the breaking of the circuits by the armature, a relay being associated with the electromagnet. To that end, two windings $t'$ $t^2$ arranged end to end are employed, these windings having a common soft iron core $t^3$, and the said core $t^3$ is provided at one side of the winding $t'$, with an extension $t^4$ which latter is provided with a contact part $t^5$ suitable for engaging, when the said core is attracted by the winding $t^2$, between two springs $u'$ $u^2$ connected to the terminals of the resistance $d$. The said core $t^3$ is provided at one side of the winding $t^2$, with an extension $t^6$ which is provided with a contact part $t^7$ engaging, when the said core is attracted by the winding $t'$, with a first spring $v'$, and, when the said core is attracted by the winding $t^2$, with a second spring $v^2$. The armature $c$ is provided with an extension $c^2$ having a contact $c^3$ capable of coming into engagement with a contact $w$ when the armature reaches its released position, and the armature itself is provided with a contact $c^4$ suitable for coming into engagement with a contact $w'$ when the armature reaches its contact position. The two terminals of the winding $t'$ are connected respectively to the contact $w'$ and the spring $v^2$, and the two terminals of the winding $t^2$ are connected respectively to the contact $w$ and the spring $v'$. The contact $t^7$ and the armature $c$ are connected in the circuit of the electromagnet, in such a manner that when the armature having been attracted arrives at its contact position—the core $t^2$ being in the position shown in Fig. 11—there takes place, by contact of the parts $c^4$ and $w'$, the closing of a circuit over the armature $c$, the contacts $c^4$ and $w'$, the winding $t'$ and the spring $v^2$, and consequently causing attraction of the core $t^3$ by the winding $t'$, breaking of the circuit $d$ $u'$ $t^5$ $u^2$ by the movement of the contact $t^5$, and consequently the switching, into the circuit of the winding of the electromagnet, of the resistance $d$, and concurrently, the breaking of contact between $t^7$ and $v^2$, and consequently the breaking of the circuit in which is situated the winding $t'$, and closing of contact between the contact $t^7$ and the spring $v'$. When the armature returns to its released position, there takes place, owing to contact of the contacts $c^3$ and $w$, the closing of a circuit over the armature $c$ its extension $c^2$, the contacts $c^3$ and $w$, the winding $t^2$, the spring $v'$ and the contact $t^7$, and consequently causing attraction of the core $t^3$ by the winding $t^2$—the said core having then been brought back to the position shown in Fig. 11—the closing of the circuit $d$ $u'$ $t^5$ $u^2$ and consequently the short-circuiting of the resistance $d$ and at the same time the breaking of contact between $t^7$ and $v'$, and consequently causing breaking of the circuit in which is contained the winding $t^2$, and the establishing of contact between the contact $t^7$ and the spring $v^2$.

Fig. 12 shows an arrangement adapted for use in cases where currents of great density are employed, the electromagnet being utilized as a relay for operating a distant control switch. The means shown in this instance for switching the resistance $d$ into the circuit of the winding $b$ of the electromagnet comprises an extension $x$ of the armature $x'$ of the electromagnet $x^2$ of the distant control switch which, when the said armature is attracted, raises the end of a spring $e$—which, as is the case in the construction illustrated in Figs. 7–9, is connected to one of the terminals of the said resistance $d$ and provided with a contact $e'$ remaining normally in contact with a contact $j'$ connected to the other terminal of the said resistance—and breaks contact between the said contacts $e'$ $j'$, switching the resistance $d$ into the circuit of the winding $b$ of the electromagnet. One terminal of the winding $x^2$ of the electromagnet of the distance contact breaker is connected to the line circuit, and the other terminal thereof is connected to a contact screw $y$ and also to one of the carbon contacts of a spark extinguisher, the contacts $y^2$ $y^3$ of which are carried respectively by the armature $c$ of the relay electromagnet and by a spring secured to the said armature, in such a manner that current passes into the winding of the electromagnet of the distant control switch only when the armature $c$ has arrived at its contact position, and ceases to pass through the said winding only when the armature $c$ has left its contact position, so that the armature $x'$ of the said electromagnet of the distant control switch is attracted and released only with a certain retardation relatively to the armature $c$, and the short-circuiting of the resistance $d$, produced by the release of the armature $x'$, will take place in practice only when the armature $c$ has returned to its detached positions. When the contact pieces $y^2$, $y$, and $y^3$ $y'$ are respectively in contact, the current which passes through the winding of the electromagnet passes equally in the contacts $y^2$, $y$, and $y^3$, $y'$. When the contacts are broken, the contacts $y^2$, $y$ are first broken, and all the current passes through the contacts $y^3$, $y'$, which are broken only after the contacts $y^2$, $y$. Consequently, the contacts $y'$, $y^3$ act as a spark extinguisher.

In Fig. 13, the resistance $d$ is composed of a comparatively long spring blade, the armature $c$ being connected to a lever $m$ pivoted at a point $m°$ and provided with a brush $m'$, in such a manner that the latter constantly engages with the said resistance $d$ and switches into circuit a portion of the same, which increases as the said armature approaches its contact position, and vice-versa; owing to which, if the said resistance $d$ has been properly selected, the effects of the variation of reluctance are absolutely compensated at all positions of the armature.

In Figs. 14 and 15, the resistance $d$ embodies a series of spring blades $n$ of different curvature, attached to the armature $c$ in such a manner that the said blades short-circuit the said resistance normally and insert into the circuit a portion of the same, which is increased as the said armature $c$ approaches the position of contact, and vice-versa; owing to which, and in the same conditions, exactly the same result as that referred to above is obtained.

In Figs. 14 and 15, wherein the resistance $d$ embodies a set of coils, when the armature is in its contact position, the longest member of the switch $n$ only is in contact with its terminal of the respective resistance coil, and the current passes through all the coils of the resistance $d$. If the armature is released, the next longer member of the switch comes first into contact with its abutment and the left-hand coil of the resistance $d$ is short-circuited; the next longer member of the switch then comes into contact with its abutment and the middle coil of the resistance is short-circuited and finally the shortest member of the switch comes into contact with its abutment and the last coil of the resistance is short-circuited.

The armature retracting spring can be either done away with, the whole electromagnet being then arranged as shown in Fig. 13, in such a manner that the weight of its armature plays the part of the said spring; or arranged, as shown in Fig. 14, at one of the ends of a lever $o$ pivoted at a certain point of its length to a pin $o°$ and connected at its opposite end to the corresponding armature $c$, and having a projection $o'$ which is made in such a manner and exposed to the action of such an additional spring $o^2$ that the result desired is obtained.

The calculation of the resistance $d$ (or of the system which can be put in its place as already stated), is made in any case in such manner as to satisfy properly the necessary conditions; the said calculation being effected for example in one of the most important cases of applying the invention to an electromagnet suitable for forming an overload preventer.

In those cases wherein the resistance of the circuit must be increased as soon as the strength of current attains a maximum $I'$, and on the other hand, reduced as soon as the said strength attains a minimum $I^2$, it is preferable to use the construction shown in Fig. 16, which constitutes an overload preventer, it comprising an electromagnet constructed as hereinbefore described with reference to the method of carrying out the invention illustrated in Figs. 1–3, and provided with a shunt $p$ inserted into the available circuit, the armature $c$ being connected to a contact breaker $q$ which in its turn is designed in such a manner that in its closed position it short-circuits a resistance $r$ which in its turn is also inserted into the said circuit. The electromagnet itself, the said resistance $r$ and the compensating resistance $d$ are so calculated that the magnet becomes operative as soon as the above mentioned maximum $I'$ is attained. The resistance which is then at once switched into circuit, produces immediately a lowering of the current strength sufficient to avoid an overload, but insufficient to reduce the said current below its minimum $I^2$, and the compensating resistance further reduces the strength of the current passing through the magnet to compensate for the effects of the variations of reluctance, produced by the movement of the armature $c$ into its contact position, that, notwithstanding the switching in of the resistance $r$, the armature $c$ is not released thereby, as would obviously happen if the resistance $d$ were calculated in such a manner as to compensate entirely for the said effects.

It is obvious that the invention is by no means limited to the constructions which have been more particlarly described, but comprises on the contrary any modifications as well as any applications other than those which have been more particularly described.

What I claim as my invention and desire to secure by Letters Patent is:—

1. The combination with an electro-magnet having an armature movable into contact and released positions relatively thereto, of a resistance of a value to compensate for the effects of the variations of reluctance in the magnetic circuit when the armature is in contact and released positions and means for rendering said entire resistance operative when the armature is in contact position and until the armature is in proximity to its released position and for rendering said entire resistance inoperative during the releasing movement of the armature.

2. The combination with an electro-magnet having an armature movable into contact and released positions relatively thereto, of means including a resistance and contact devices therefor operative automatically to reduce the effective attractive force of the magnet when the armature approaches and is in contact position and maintaining said entire resistance operative until the armature is in proximity to its released position during releasing movement thereof.

3. The combination with an electro-magnet having an armature movable into contact and released positions relatively thereto, of a resistance adapted to be connected in series with the winding of the electro-magnet and having means for rendering the whole of said resistance operative when the armature is in contact position and for maintaining the same operative while the armature moves from contact position to a position in proximity to released position and thereupon rendering the whole of said resistance inoperative.

4. The combination with an electro-magnet having an armature movable into contact and released positions relatively thereto, of a resistance adapted to be connected in series with the winding of the electro-magnet and having means for rendering it operative when the armature is in contact position and for maintaining it operative while the armature moves from contact position to a position in proximity to released position, said means rendering the resistance inoperative while the armature is in fully released position and while the armature moves from released position to a position in proximity to its contact position.

5. In an electro-magnet, a resistance calculated so as to compensate the variation of reluctance in the magnetic circuit, produced by the passage of the armature from its detached to its contact position, a lever, and contact means coöperative therewith to switch the resistance into circuit, in one of the positions of said lever and in the other position of said lever, to short circuit the resistance, the free end of the said lever being bifurcated, and an extension of the armature engaging with play between the branches of the said fork.

6. The combination with an electro-magnet having an armature, of a resistance medium adapted to be connected in series with the winding of the electro-magnet and having a value to compensate for effects of the variations in the reluctance in the circuit of such magnet, and means for connecting said resistance with the magnet winding when the armature reaches a position in proximity to its contact position during the movement of the armature in such direction and for maintaining such connection until the armature reaches a position in proximity to its released position during movement of the armature in such direction, said means disconnecting the resistance from the magnet winding while the armature is in fully released position and maintaining it disconnected until the armature reaches a position in proximity to its contact position during movement of the armature in such direction.

In testimony whereof I have hereunto set my hand in presence of two subscribing witnesses.

PIERRE BOSSU.

Witnesses:
   HANSON C. COXE,
   PAUL BLUM.